W. L. WILCOX & T. G. RAKESTRAW.
STEAM TRAP.
APPLICATION FILED DEC. 26, 1913.
1,137,102.
Patented Apr. 27, 1915.
3 SHEETS—SHEET 1.
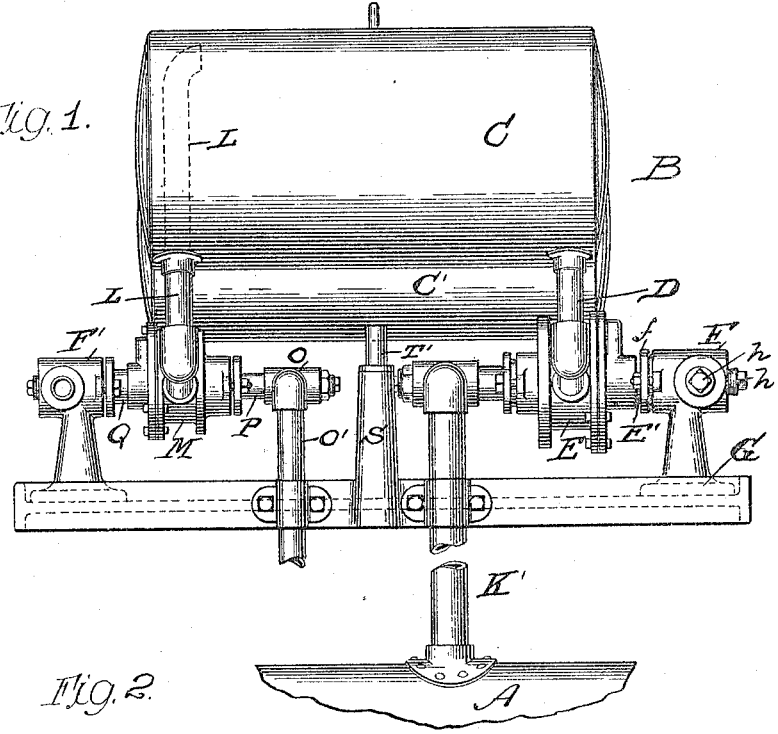
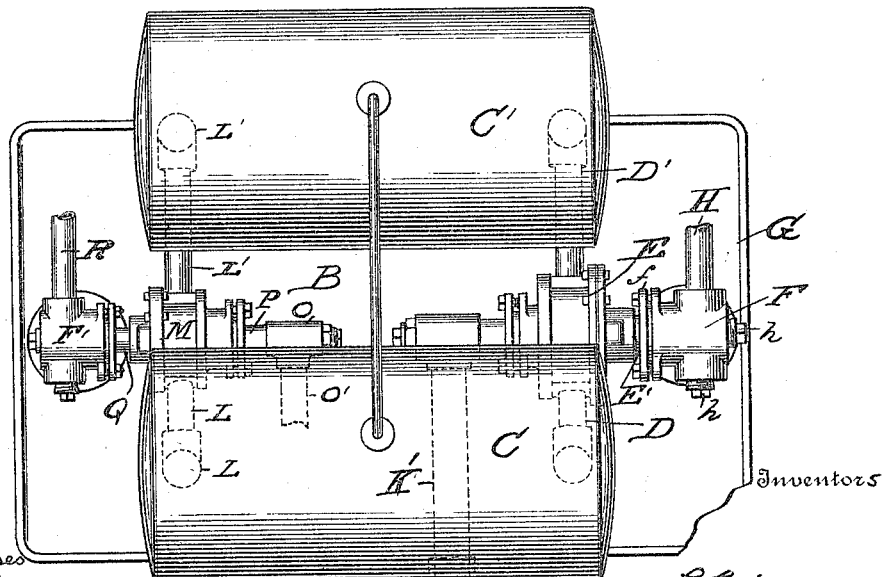

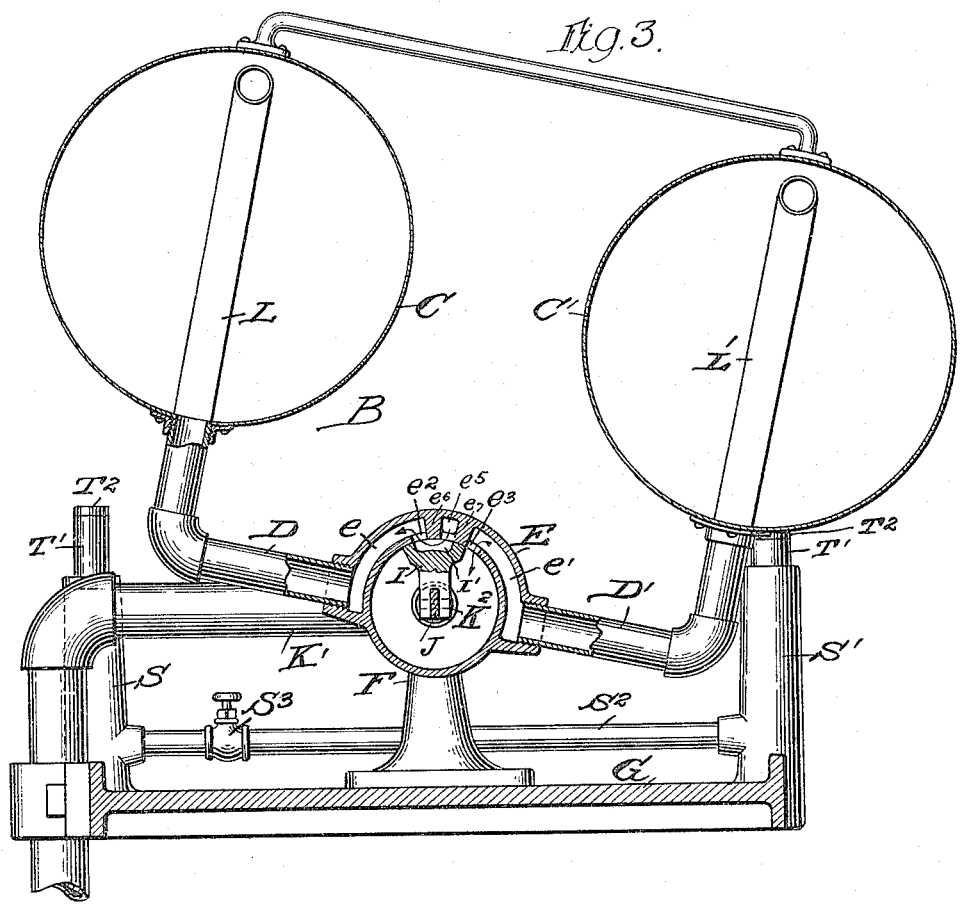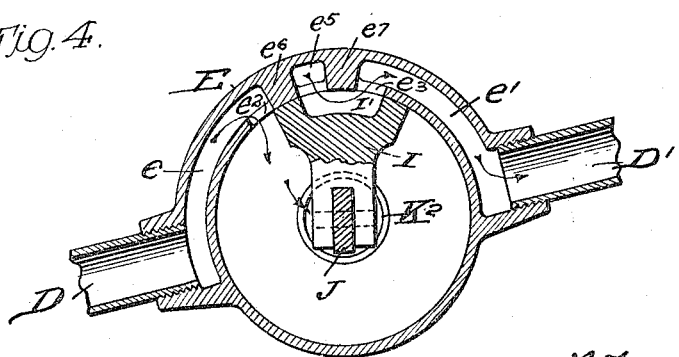

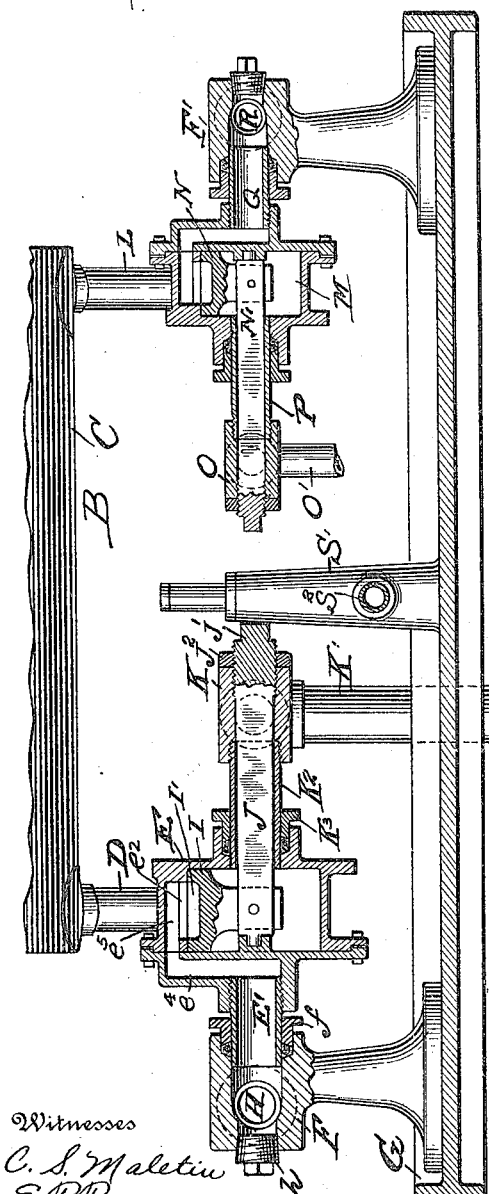
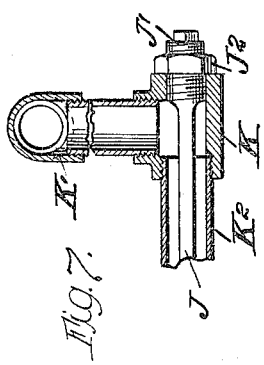
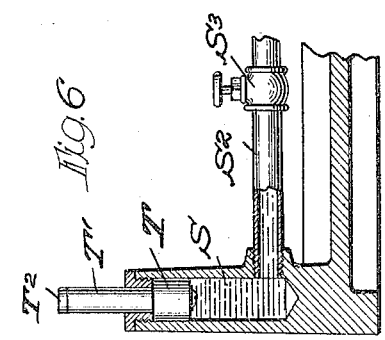

UNITED STATES PATENT OFFICE.

WILLIAM L. WILCOX AND THOMAS G. RAKESTRAW, OF DETROIT, MICHIGAN, ASSIGNORS TO DUPLEX STEAM TRAP MANUFACTURING COMPANY, OF DETROIT, MICHIGAN.

STEAM-TRAP.

1,137,102.  Specification of Letters Patent.  Patented Apr. 27, 1915.

Application filed December 26, 1913. Serial No. 808,810.

*To all whom it may concern:*

Be it known that we, WILLIAM L. WILCOX and THOMAS G. RAKESTRAW, citizens of the United States, residing at Detroit, county of Wayne, State of Michigan, have invented a certain new and useful Improvement in Steam-Traps, and declare the following to be a full, clear, and exact description of the same, such as will enable others skilled in the art to which it pertains to make and use the same, reference being had to the accompanying drawings, which form a part of this specification.

Our invention relates to an improvement in steam traps or water feeders for boilers, shown in the accompanying drawings and more particularly pointed out in the following specification and claims.

One object of our invention is to provide a trap of the tilting type simple in its construction and operation in which all counterpoise weights and levers for controlling the action of the necessary valves required to admit water and steam to the tank and to discharge water from the tank into the boiler are dispensed with; together with all counterpoise weights and levers heretofore required to support the tank in a position to receive the water prior to its delivery to the boiler.

Another feature of the invention consists in the elemination of all check valves usually employed between the returns and the trap and between the trap and the boiler,—the construction being such that only two valves are required, one controlling the alternate admission of water to the respective tanks, the other controlling the alternate admission of steam to each tank, each valve being automatically operated upon the tilting of the tanks to provide for their alternate filling and emptying.

Another feature of the invention consists in providing a pair of twin tanks connected together and supported on trunnions so as to operate as a single unit, the arrangement being such that water is delivered into one tank while the other tank is discharging its contents into the boiler thereby insuring practically a continuous feed to the boiler.

Other advantages and improvements will hereafter appear.

In the drawings accompanying this specification:—Figure 1 is a side elevation of the trap and a fragmentary portion of a boiler showing the connection between the trap and boiler. Fig. 2 is a plan view of the trap. Fig. 3 is a cross sectional view through the trap and the valve controlling the delivery of water to and from the same;—the arrows indicating the delivery of the water to the elevated tank and the discharge of water from the depressed tank. Fig. 4 is a detail cross sectional view of the water inlet valve tilted in the opposite direction to that indicated in the preceding figure;—the arrows indicating the passage of water to and from the tanks, (not shown). Fig. 5 is a longitudinal sectional view through the device with parts broken away and in elevation. Fig. 6 is a cross sectional view of a detail indicating the device employed to cushion the impact of the tank upon tilting. Fig. 7 is a sectional view of a detail of the pipe delivering the water to the boiler showing the means employed for holding the valve in a fixed relation to its rocking chamber whereby the delivery of water to the respective tanks and to the boiler may be controlled.

Referring now to the letters of reference placed upon drawings:—A denotes a boiler. B indicates the trap or boiler feeder located above the boiler in the usual manner.

C, C' are tilting twin tanks supported at one end by the water pipes D, D' leading to a rocking valve chamber E. The valve chamber is provided with a projecting nipple E' journaled in a bearing F, rising from the supporting tray G.

$f$ is a gland engaging the bearing F to insure a water tight connection between the nipple and bearing.

H denotes a water delivery pipe to convey the feed water or condensation to the valve chamber E. One or more delivery pipes H may be connected with the bearing F, but when only one pipe is employed plugs $h$ are provided to close the additional openings. The rocking valve chamber E,—see Fig. 4—is constructed with passages $e$ and $e'$ having ports $e^2$ and $e^3$ opening into its central chambered portion.

$e^4$ is a passage in the side wall of the valve chamber (see Fig. 5) extending from the hub supporting the nipple E', radially into the passage $e^5$, between the walls $e^6$ and $e^7$, separating the arc-shaped passages $e$ and $e'$.

I is a valve having a channel I' designed to connect the passage $e^5$ with the port $e^2$ when the tank C is elevated;—and to connect the passage $e^5$ with the port $e^3$ when the tank C' is in its elevated position. The valve I is secured to a bar J, the latter being held against rotation by a screw-threaded engagement with the T pipe fitting K, carried by the water pipe K' leading to the boiler. Projecting from the T fitting K is a nipple $K^2$ surrounding the bar J and extending into the hub of the valve chamber E to convey the water to the pipe K' and to serve as a trunnion for the valve chamber to rock on.

$K^3$ is a gland engaging the hub of the valve chamber providing a water tight connection between the valve chamber and the nipple $K^2$. The bar J is rectangular in cross section and relatively narrow as indicated in Figs. 4, and 7, to provide a passage for the water through the nipple $K^2$, and through the connecting T fitting on each side of the bar. The bar J is screwed into the T fitting and squared at J' to accommodate the use of a wrench in assembling and adjusting the parts.

$J^2$ is a lock nut to secure the bar against accidental displacement when so adjusted.

L, L' are steam pipes extending upwardly into the twin tanks C and C', which they also assist in supporting;—the discharge or open end of the pipes being adjacent to the top of its respective tank that the steam may be delivered above the water level therein.

M is a rocking steam valve chamber with which the pipes L and L' connect, being similar in construction and operation to the rocking water valve chamber E.

N is a steam valve secured to the fixed bar N', in turn engaged to the T O, on the exhaust pipe O'.

P is a nipple projecting from the T into the hub of the steam valve casing through which the bar N' projects, the nipple serving as a trunnion for the valve casing.

Q is a nipple projecting from the opposite hub of the valve casing into the bearing F'.

R denotes a pipe to conduct steam from the boiler to the valve chamber.

As previously indicated the construction of the valve controlling the admission of the steam to the respective tanks and its several connections and manner of operation are similar to the water valve and its connections and manner of operation, therefore a detailed description of the steam valve and its co-acting parts will be unnecessary to a full understanding of their operation.

On each side of the tray are wells S, S' connected together by a pipe $S^2$ under control of a valve $S^3$. Housed in each well is a plunger T having a projecting stem T' the end of which may be filled with a pad of leather or other cushion to receive the impact of the descending tank.

$T^2$ is an annular cap to secure the plunger against accidental dislodgment, through which the stem T of the plunger projects.

Having indicated the several parts by reference letters the construction and operation of the apparatus will be readily understood.

The trap being mounted above the boiler so that the water delivered to it may pass by gravity into the boiler is connected by the pipe H with the returns from the heating system or feed water supply. Water passing through the pipe H enters the valve chamber through the nipple E', thence up through the passage $e^4$ in the side of the valve chamber, thence through the passage $e^5$ by way of the channel I' in the valve I, through the port $e^2$, (see Fig. 3) through the passage $e$, thence through the pipe D into the elevated tank C. When a sufficient volume of water has entered the tank C to overcome the weight of the tank C', the tanks tilt on their supporting trunnions which action cuts off the delivery of water to the tank C formerly occupying an elevated position, the water being delivered instead to the now elevated tank C' as will be hereafter more fully explained.

Attention is now directed to the rocking steam valve chamber M through which steam may pass from the boiler to the respective tilting tanks.

As before stated the construction of the steam valve and the co-acting parts are similar to the valve controlling the delivery of water to the tanks, therefore upon the tank C tilting under the weight of the column of water contained therein, steam passing through the pipe R is delivered through the valve chamber M by the valve N into the pipe D and thence into the tank C above the water level therein establishing boiler pressure within the tank and thereby permitting the water to pass by gravity out through the pipe D into the passage $e$ in the rocking valve chamber, through the port $e^2$, thence out through the nipple $K^2$, through the T K, down through the pipe K', to the boiler. It will be borne in mind that while the tank C is discharging its contents into the boiler, the tank C' is being filled by the returns from the heating system, or other source of supply. The alternate delivery of water to the respective tanks by the valve controlling same will be readily understood upon comparing the position of the valve chamber E as indicated in Fig. 3, with the position of the same valve chamber as shown in Fig. 4,—it being apparent that water delivered to the valve when occupying the last position will then pass into the tank C', instead of the tank C, as formerly. As soon as the weight of water in the tank C' overcomes the weight of the tank C, the tanks will tilt back to their former position, thereby reversing the water and steam control valves. Steam will now be delivered to the tank C' establishing boiler pressure within and permitting the water therein to pass to the boiler as previously described,—while any steam remaining in the now elevated tank C will be released by the steam valve into the exhaust pipe O' to pass thence into the open air or to a sewer or other connection,— the object being to free the tank of any pressure that might have a tendency to retard its refilling. The jar that may otherwise result from the tilting of the tanks is absorbed when the tank strikes the stem of the plunger T housed in the oil well S— which action forces the fluid out through the pipe $S^2$ into the opposite well S', the speed with which the fluid may pass through the pipe $S^2$ and the cushioning effect resulting therefrom being controlled by the valve $S^3$. By constructing the trap with tanks arranged horizontally the device may be located in situations where there is relatively very little space between the top of the boiler and the ceiling of the boiler room.

Having thus described our invention, what we claim is:—

1. In an apparatus such as described, a base, a rocking valve chamber mounted upon said base, said valve chamber having a passage in the upper portion thereof, and extending substantially one half the circumference of said valve chamber, spaced partitions extending from the outer wall of the passage through the passage, the inner wall of said passage having an opening formed therein and extending beyond the outer sides of the spaced partitions, said spaced partitions dividing the passage into separated passages, the said extension of the opening beyond the outer sides of the partitions forming ports at the inner ends of said separated passages, said spaced partitions having a passage therebetween, a valve disposed in said valve chamber for connecting the passage located between the spaced partitions with one of the separated passages, while permitting communication between the other of the separated passages and the interior of the chamber, and a pair of tanks supported by the valve chamber and in communication with the separated passages.

2. In an apparatus such as described, a base, a rocking valve chamber mounted upon said base, said valve chamber having a passage formed in the upper portion, the inner wall of said passage having an opening therein and providing communication between the passage and the interior of the chamber, transverse partitions extending through said passage and into the opening provided in the inner wall of the passage, and dividing said passage into separated passages, the extension of the opening beyond the outer sides of the partitions forming ports at the inner ends of said separated passages, said transverse partitions being spaced apart providing a passage therebetween, a valve disposed within the valve chamber, said valve having a channel formed in its outer side, said channel adapted to connect the passage between the transverse partitions with one of the separated passages, said valve upon movement in opposite directions permitting communication between one of the separated passages and the interior of the valve chamber, and a pair of tanks supported by the rocking valve chamber and being in communication with separated passages.

In testimony whereof, we sign this specification in the presence of two witnesses.

WILLIAM L. WILCOX.
THOMAS G. RAKESTRAW.

Witnesses:
SAMUEL E. THOMAS,
CHRISTINE MALETIN.

Copies of this patent may be obtained for five cents each, by addressing the "Commissioner of Patents, Washington, D. C."